United States Patent [19]

Kurtz

[11] Patent Number: 5,337,988
[45] Date of Patent: Aug. 16, 1994

[54] MIRROR MOUNTING BRACKET

[76] Inventor: Thomas D. Kurtz, 510 Island View Road, Rock Falls, Ill. 61071

[21] Appl. No.: 984,515

[22] Filed: Dec. 2, 1992

[51] Int. Cl.⁵ .............................................. F16M 13/00
[52] U.S. Cl. ................................... 248/477; 248/488; 248/495
[58] Field of Search ............ 248/488, 476, 477, 475.1, 248/495

[56] References Cited

U.S. PATENT DOCUMENTS

| | | | |
|---|---|---|---|
| 848,624 | 4/1907 | Bell | 248/477 |
| 2,532,162 | 11/1950 | Goss. | |
| 2,696,962 | 12/1954 | Goss | 248/488 X |
| 3,377,042 | 4/1968 | Breeding et al. | 248/488 X |
| 4,238,103 | 12/1980 | Kurtz. | |
| 4,394,000 | 7/1983 | Kurtz | 248/488 X |
| 4,614,322 | 9/1986 | Goltz | 248/488 X |

FOREIGN PATENT DOCUMENTS 239373  8/1964  Fed. Rep. of Germany ...... 248/488

Primary Examiner—Rinaldi I. Rada
Attorney, Agent, or Firm—Vernon J. Pillote

[57] ABSTRACT

An adjustable mirror mounting bracket including a stationary bracket member and a movable bracket member slidably mounted on the stationary bracket member. The stationary bracket member has two rows of corrugations and an opening for receiving a mounting screw between the rows, and the movable bracket member has two fingers for engaging a respective row of detents while by-passing the head on the mounting screw.

4 Claims, 1 Drawing Sheet

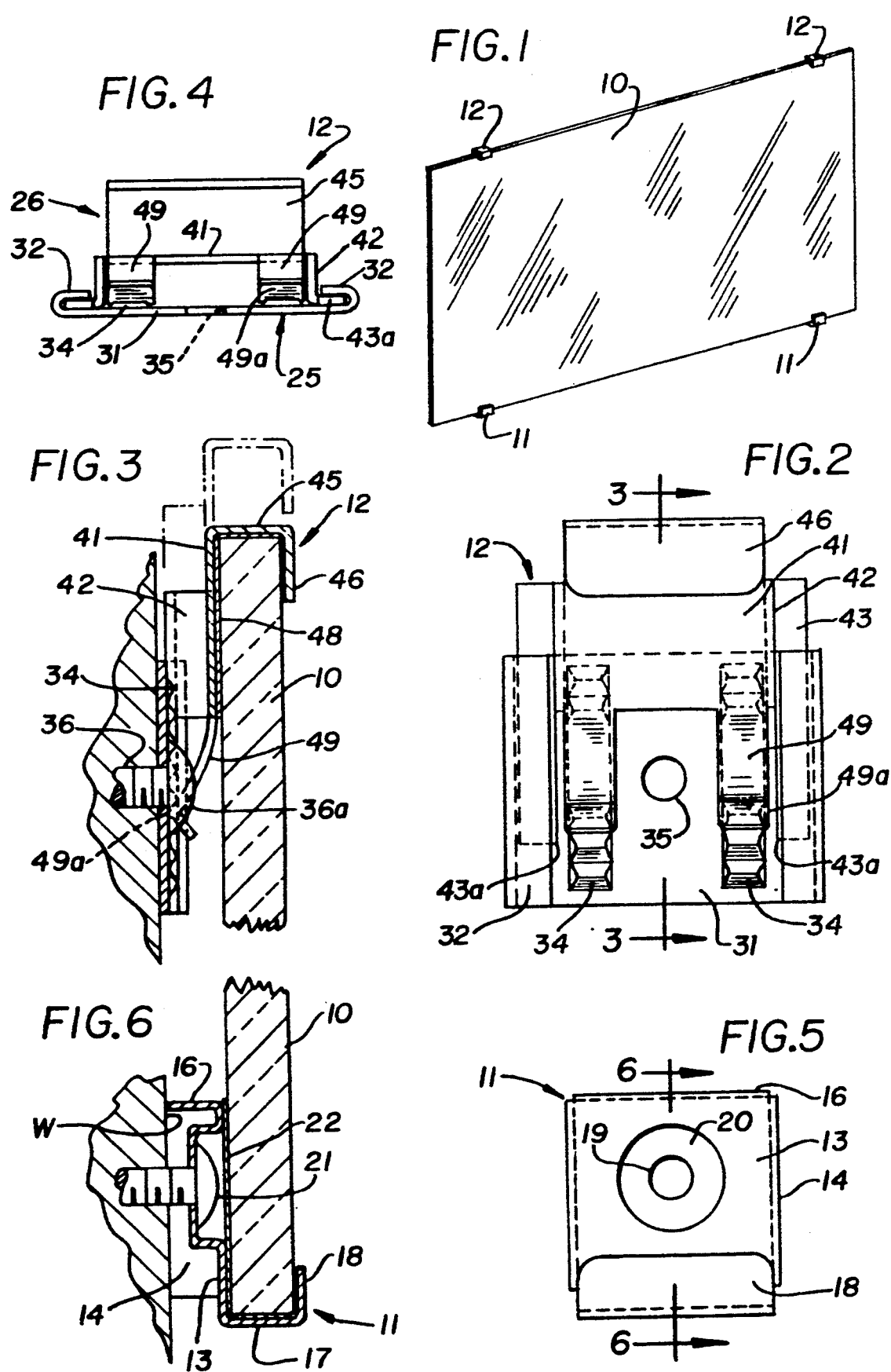

MIRROR MOUNTING BRACKET

BACKGROUND OF THE INVENTION

It is common practice to mount glass mirrors and the like on a wall using brackets having hooks that engage the edge of the mirror, and various brackets having an adjustable mirror engaging hooks have heretofore been proposed. The adjustable type hooks commonly have a stationary bracket member that is adapted for attachment to a wall as by screws and a movable bracket member that is slidable relative to the stationary bracket member. My prior U.S. Pat. No. 4,238,103 discloses an adjustable mirror mounting bracket in which a spring is arranged to yieldably urge the movable bracket member into a mirror engaging position. While this mirror mounting bracket is well adapted for its intended use, the use of a spring increases the cost of manufacture and assembly. Some other adjustable brackets such as shown in U.S. Pat. No. 2,532,162 are arranged to be manually adjusted and utilize a detent arrangement for holding the movable bracket member in the adjusted position. While this bracket is more economical to fabricate, the corrugations or detents are arranged in a row along the centerline of the stationary bracket and the screw or fastener receiving openings are located at opposite ends of the row of corrugations such that the heads on the mounting screws or fasteners can interfere with or impede adjustment of the movable bracket member in the stationary bracket member. Further, this arrangement requires the stationary bracket to be substantially longer than the adjustment range of the movable bracket member, to provide space for the screw mounting holes at the ends of the row of corrugations.

SUMMARY OF THE INVENTION

It is the object of the present invention to overcome the disadvantages of the prior art by providing a mirror mounting bracket of the type in which the movable bracket member is maintained in adjusted position on the stationary bracket member by a detent arrangement, wherein the mounting screw cannot interfere with adjustment of the movable bracket member on the stationary bracket member, and which minimizes the overall size of the stationary bracket member for a given range of adjustment of the movable bracket member relative to the stationary bracket member.

BRIEF DESCRIPTION OF THE DRAWINGS

FIG. 1 is a perspective view of a mirror attached to a wall by a plurality of mirror mounting brackets;

FIG. 2 is a front elevational view of an adjustable mirror mounting bracket embodying the present invention;

FIG. 3 is a vertical sectional view taken on the plane 3—3 of FIG. 2 and illustrating the adjustable mirror mounting bracket installed on a wall;

FIG. 4 is an end view of the mirror mounting bracket of FIG. 2;

FIG. 5 is a front elevational view of a fixed mirror mounting bracket; and

FIG. 6 is a transverse sectional view taken on the plane 6—6 of FIG. 5.

DETAILED DESCRIPTION

FIG. 1 shows a mirror 10 mounted on a wall by a plurality of mirror mounting brackets. The weight of the mirror rests on the lower mirror mounting brackets and it is customary to use two or more lower mirror mounting brackets 11 in which the mirror engaging hooks are fixed vertically in relation with the wall mounting portions of the bracket. The upper mirror mounting brackets designated 12 are arranged so that the mirror engaging portions are adjustable relative to their mounting portions into and out of engagement with the edge of the mirror.

The lower mirror mounting brackets 11 shown at FIGS. 5 and 6 are of a known construction and include a generally rectangular body portion 13 having rearwardly extending side flanges 14 and a top flange portion 16 and a mirror engaging hook at the front of the body portion. The mirror engaging hook includes a forwardly extending mirror support flange 17 and an upwardly extending mirror retaining lip 18 spaced from the front of the body portion 13 a distance sufficient to accommodate the thickness of a mirror. A screw receiving apperture 19 is provided in the body portion 13 and the body portion is preferably formed with a depression or recess 20 to receive the head of the screw 21 as best shown in FIG. 6. As is known in the art, a liner 22 formed of thin fiber board, plastic or the like is provided along the front side of the body portion 13 and along the inner side of the support flange 17 to inhibit chipping of the mirror. As shown in 6, the lower mirror mounting bracket 11 is adapted to be attached directly to a wall W by a screw 21 with the rear edges of the flanges 14 and 16 engaging the wall. The hook portion of the lower mirror mounting bracket is fixed with relation to the wall mounting portion to support the weight of the mirror and to laterally retain the lower edge of the mirror.

The adjustable mirror mounting bracket 12 of the present invention in general includes a stationary bracket member 25 and a movable bracket member 26 that is adjustable relative to the stationary bracket member. The stationary bracket member includes a generally rectangular first body portion 31 and in-turned flange portions 32 along opposite side edges of the body portion 31 and providing relatively parallel inwardly opening guide grooves at a front side of the first body portion. The first body portion also has two rows of corrugations or detents 34, with each row disposed adjacent and parallel to a respective one of the guide grooves. The first body portion has a screw receiving opening therethrough intermediate the two rows of corrugations and the first body portion has a flat area around the screw receiving opening for receiving the head 36a of a mounting screw 36 as shown in FIG. 3. The screw 36 is preferably of a type having a flat bearing surface and may, for example, be of the pan head type having a flat top surface or the button-head or truss-head type having a rounded outer face. The screw receiving opening is preferably located approximately medially between the end edges of the first body portion.

The movable bracket member 26 includes a generally rectangular second body portion 41 and lateral flange portions 42 extending laterally to a rear side of the second body portion along opposite side edges thereof, and out-turned flange portions 43 along rear edges of the lateral flange portions. The out-turned flange portions 43 are disposed in a plane generally parallel to and spaced from a rear side of the second body portion 41 and are guidably received in the guide grooves so that the movable bracket member is slidable relative to the stationary bracket member along the guide grooves, with the first and second body portions spaced apart a distance at least sufficient to accommodate the head of the mounting screw therebetween.

A panel engaging hook is formed integrally with one end of the second body portion and includes a forwardly extending flange portion 45 at an upper edge of the body portion 41 and a depending lip portion 46 at the forward edge of the flange portion 45, with the lip spaced from the body portion 41 a distance at least sufficient to accommodate the thickness of the mirror. A protective liner 48, conveniently formed of thin fiber board, plastic or the like is provided and arranged to extend along the front face of the body portion 34 and along the inner side of the flange 45 to inhibit chipping of the edges of the mirror. The movable bracket member also has two fingers 49 formed integrally with a lower edge of the second body portion 41. The fingers 49 are inclined rearwardly toward a plane through the out-turned flange portions 43 as best shown in FIGS. 3 and 4, and terminate in nose portions 49a arranged to engage respective ones of the rows of corrugations 34, to releasably hold the movable bracket member in adjusted position on the stationary bracket member. The fingers are spaced apart a distance to by-pass the head of a screw in the opening 35 in the first body portion. The first body portion has a flat screw-head receiving area around the opening 35 and between the rows of corrugations 34, and the fingers are spaced apart a distance to by-pass the screw head receiving area. Thus, the head of a mounting screw does not interfere with installation of the movable bracket member on the stationary bracket member or adjustment of the movable bracket member relative to the stationary bracket member. As best shown in FIG. 2, the out-turned flange portions have flange extensions 43a that extend beyond the respective lateral flange portion 42 and alongside a respective one of the nose portions 49a, to guide the movable bracket member on the stationary bracket member as the nose portions 49a engage the upper end of the respective row of corrugations. The movable bracket member can be adjusted along substantially the full length of the rows of corrugations and the overall length of the stationary bracket can be limited to substantially the length of the rows of corrugations.

From the foregoing it is thought that the construction and operation of the adjustable mirror mounting brackets will be readily understood. The stationary mounting bracket 25 can be mounted by a screw 36 on a wall or the like prior to assembly of the movable bracket on the stationary bracket. However, as will be seen from FIG. 2, the adjustable bracket construction provides access to the screw mounting opening 35 when the movable bracket is in a raised condition on the stationary bracket member so that the movable bracket member can be assembled on the stationary bracket member prior to attachment of the stationary bracket to a support surface. The adjustable brackets are mounted on a support surface at locations spaced above the fixed brackets 11 such that the lips 45 on the adjustable brackets, when the movable brackets are in a raised position, will clear the upper edge of the mirror when it rests on the lower brackets and is moved laterally into position. The movable bracket members 26 are then manually pressed downwardly to a position in which the lip 46 overlies the face of the mirror to hold the mirror in position. While the adjustable brackets are herein shown mounted on the upper edge of the mirror, it is to be understood that the adjustable brackets are also adapted to be used at the side edges of the mirrors in some installations.

The embodiments of the invention in which an exclusive property or privilege is claimed are defined as follows:

1. A bracket for mounting a panel on a supporting surface comprising, a stationary bracket member including generally rectangular first body portion and in-turned flange portions along opposite side edges of the first body portion providing relatively parallel inwardly opening guide grooves at one side of the first body portion, the first body portion having two rows of corrugations with each row adjacent and parallel to a respective one of the in-turned flange portions, the first body portion having screw receiving opening means therethrough intermediate the two rows of corrugations for receiving a mounting screw, a movable bracket member including a generally rectangular second body portion and lateral flange portions extending laterally to a rear side of the second body portion along opposite side edges thereof and out-turned flange portions along rear edges of the lateral flange portions, said out-turned flange portions being disposed in a plane generally parallel to and spaced from a rear side of said second body portion and guidably received in the guide grooves whereby the movable bracket member is slidable relative to the stationary bracket member along the guide grooves with the first and second body portions in spaced parallel relation, the movable bracket member having a panel engaging hook integral with one end of the second body portion for engaging a panel at a front side of the second body portion, the movable bracket member having two resilient fingers integral with a second end of the second body portion, the resilient fingers being inclined toward the plane in which said out-turned flange portions are disposed and terminating in nose portions arranged to engage respective ones of the rows of corrugations, the resilient fingers being spaced apart to by-pass the screw receiving opening means in the first body portion.

2. A bracket according to claim 1 wherein said out-turned flange portions have flange extensions that extend alongside a respective one of the nose portions on the fingers.

3. A bracket according to claim 1 wherein said first body portion has a flat screw head receiving area around said screw receiving opening means, said resilient fingers being spaced apart a distance sufficient to by-pass said screw head receiving area.

4. A bracket according to claim 1 wherein said screw receiving opening means is located approximately midway between end edges of said first body portion.

* * * * *